United States Patent [19]
Dietrich

[11] 3,795,377
[45] Mar. 5, 1974

[54] SUPPORTING MOUNT FOR AN INSTRUMENT STAND

[75] Inventor: Toni Dietrich, Wetzlar, Germany

[73] Assignee: Firma Wilhelm Will KG, Nauborn, Germany

[22] Filed: Oct. 31, 1972

[21] Appl. No.: 302,585

Related U.S. Application Data

[62] Division of Ser. No. 880,103, Nov. 26, 1969, Pat. No. 3,712,569.

[52] U.S. Cl............... 248/125, 248/411, 287/58 R, 350/255
[51] Int. Cl............................................ F16m 11/04
[58] Field of Search ... 248/124, 125, 411, 412, 413; 287/58 R; 350/84, 255

[56] References Cited
UNITED STATES PATENTS

| | | | |
|---|---|---|---|
| 508,557 | 11/1893 | Roulstone | 248/411 |
| 598,674 | 2/1898 | Finn | 248/411 |
| 1,326,363 | 12/1919 | Michelin | 248/411 X |
| 1,968,094 | 7/1934 | Ott | 350/84 |
| 2,095,271 | 10/1937 | Swanstrom | 292/59 UX |

Primary Examiner—William H. Schultz
Attorney, Agent, or Firm—Edmund M. Jaskiewicz

[57] ABSTRACT

A stand for a precision instrument such as a microscope is provided with a pair of vertically extending plane surfaces which are inclined to each other. The mounting block of the instrument is provided with correspondingly shaped plane surfaces so that both pairs of plane surfaces may be superposed upon each other. The mounting block is provided with locking means in the form of a rotatable locking bar which passes through the vertical slot between the plane surfaces on the stand and engages a surface of the stand facing away from the mounting block upon rotation of the locking means through an angle of about 90°. The locking member is also capable of axial movement either concurrent with its rotary movememt or independently therefrom.

4 Claims, 5 Drawing Figures

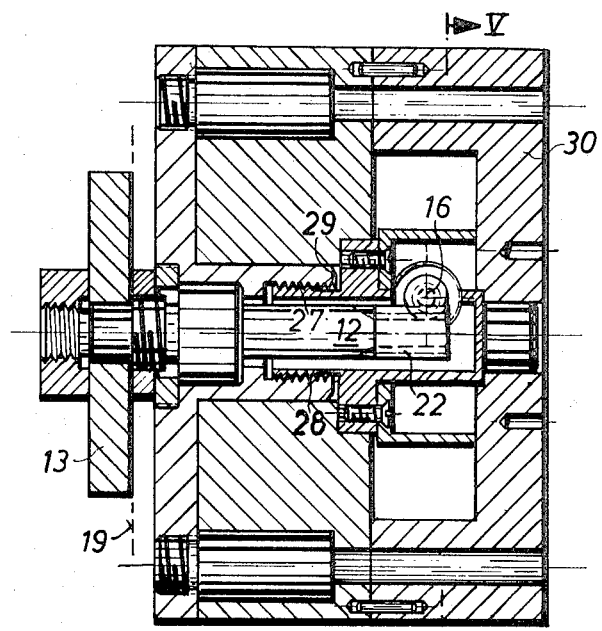
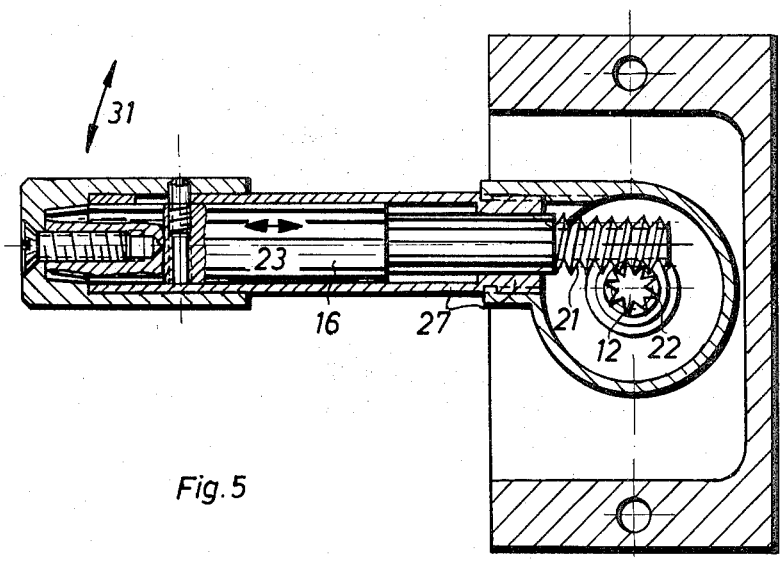
Fig. 4
Fig. 5

SUPPORTING MOUNT FOR AN INSTRUMENT STAND

This is a division of application Ser. No. 880,103, filed Nov. 26, 1969, now U.S. Pat. No. 3,712,569.

The present invention relates to the mounting of a precision instrument to a stand, more particularly, to a detachable mounting arrangement for quickly locking or unlocking an instrument on a stand.

A wide variety of precision instruments, such as various measuring devices, a microscope or the like, are attached to a suitable stand during use. Such instruments may include microscopes for moncular or binocular observation, stereomicroscopes, or various kinds of specialized microscopes for particular applications. Such instruments as presently known are generally self-contained units in that the instrument and its stand constitute a single unit. Where many such different instruments must be used such as in development and research labs, in manufacturing plants and the like, a large inventory of complete instrument units must be maintained. Such an inventory of instruments represents a considerable capital investment.

It has been proposed to provide such an instrument unit wherein a microscope, for example, could be detached from its stand. This was accomplished by providing a unilaterally open dove-tail guideway on either the instrument or the stand with the other part being separated therefrom by being pulled out from the guideway. Tis mounting arrangement was not satisfactory since considerable skill was required to position the parts into this dove-tail-shaped guideway. In addition, the guideway surfaces must be displaced axially with respect to each other in order to achieve a vertical adjustment of the instrument on the stand. If a fine vertical adjustment device was to be provided between these parts, it was then usually necessary to engage a rack and pinion gear mounted respectively on these components. This not only complicated the mounting procedure but frequent changes of instruments upon the stand subjected the gear and rack to considerable wear.

It is therefore the principal object of the present invention to provide a novel and improved mounting for an instrument upon a stand.

It is another object of the present invention to provide a detachable mounting by which an instrument can be quickly mounted upon or removed from a stand with a minimum of effort by the user.

It is a further object of the present invention to provide an instrument mounting which permits a rapid and frequent interchange of instruments upon a stand wherein each successive instrument is accurately mounted in position and ready for immediate use.

According to one aspect of the present invention there may be provided an instrument stand having vertially extending supporting surface means which may comprise a pair of plane surfaces inclined to each other. The instrument which is to be mounted may comprise a microscope having an objective tube to which is attached a mounting block provided with second supporting surface means. The stand and mounting block supporting surface means are similarly shaped so that the respective surface means can be superposed on each other. The mounting block is provided with means for lockingly engaging with the stand so as to urge the superposed supporting surface means tightly against each other to maintain the instrument in a locked position on the stand. The locking means may comprise a rotatable locking member which is engageable with a surface of the stand facing away from the instrument. The locking member is capable of axial movement either during the rotative movement or independently thereof. Thus, when the locking member is rotated through an angle of about 90° to its locking position the axial movement of the locking means draws the supporting surface means tightly against each other. When the locking means is rotated back to its unlocked position the axial movement of the locking member separates the respective supporting surface means.

Other objects and advantages of the present invention will be apparent upon reference to the accompanying description when taken in conunction with the following drawings, which are explanary, wherein;

FIG. 4 is a vertical sectional view in enlarged scale of a modification of the mounting structure of the present invention; and FIG. 5 is a sectional view taken along the line V—V of FIG. 4.

Proceeding next to the drawings wherein like reference symbols indicate the same parts throughout the various views of specific embodiment and modification of the present invention will be described in detail.

Figure 1:
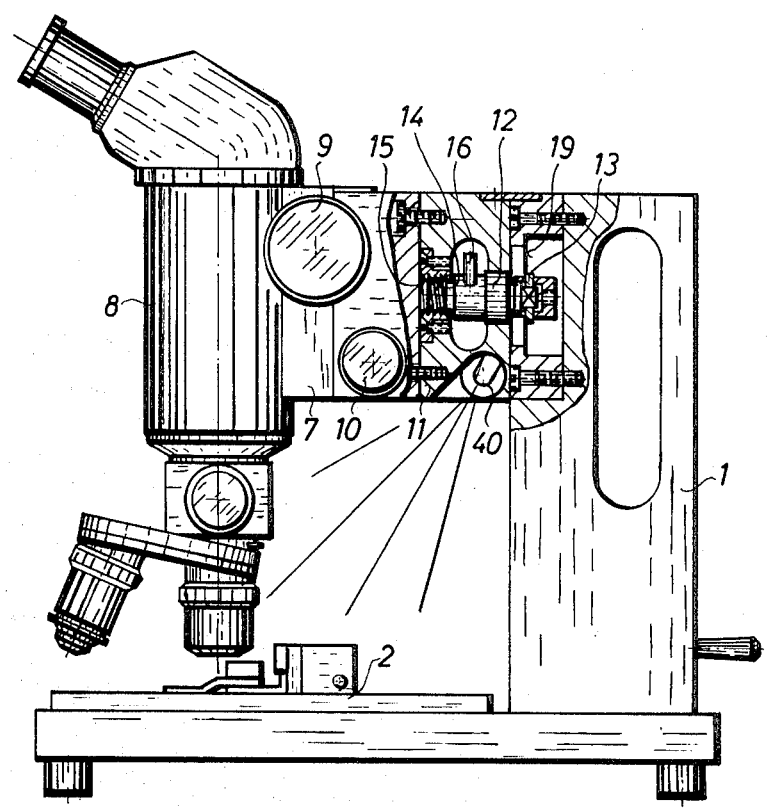
FIG. 1 is a side elevational view of an instrument and stand according to the present invention with the mounting structure being shown in section.
Figure 2:
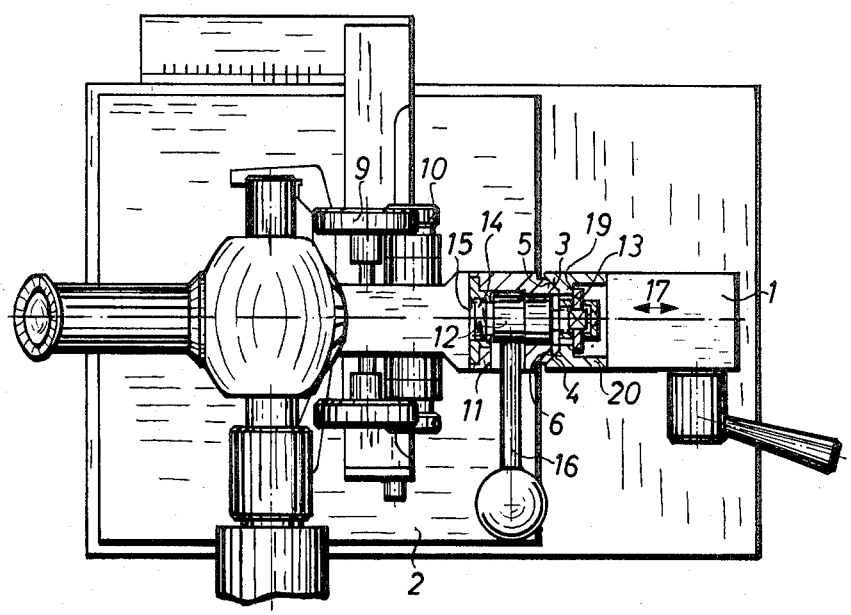
FIG. 2 is a top plan view of the instrument and stand of FIG. 1 with a portion of the mounting structure being shown in section.

As may be seen in FIGS. 1 and 2 a microscope incorporating the present invention is provided with a stand 1 having a stage 2 mounted thereon in a manner as known in the art. The stage 2 may be provided with suitable structure for retaining in fixed position an object or specimen which is to be viewed. The stage may be so constructed that it can be quickly detached from the stand and replaced by another stage which may be more suitable for a particular application. It would therefore be possible to provide an instrument having a number of stages each of which can be mounted upon a common base.

The vertically upstanding portion of the stand 1 is provided with a pair of vertical plane surfaces 3 and 4 which are inclined with respect to each other as may be seen in FIG. 2 so as to define a substantially channel-shaped configuration in cross section.

A second pair of inclined supporting surfaces 5 and 6 are provided on a mounting block 11. The plane surfaces 5 and 6 are similarly inclined to each other to define a similar configuration to that of plane surfaces 3 and 4 so that both pairs of inclined plane surfaces may be superposed against each other.

A limited or fine vertical adjustment of the microscope tube 8 can be achieved by manipulation of the hand wheels 9 and 10 which operate an adjusting structure which is known in the art and not shown in the drawings. Such a vertical adjustment device will permit a relatively limited vertical adjustment but this extent of adjustment will be considerably greater than the usual range of 60–70 mm. of previously known vertical adjustment devices. In the microscope according to the present invention the vertical adjustment device is independent of the structure for mounting the microscope to the stand as will become apparent from a subsequent description of the invention. In the embodiment of the invention as illustrated in FIG. 1 the fine vertical adjusting device is positioned between the microscope tube and the supporting stand. However, the microscope according to the present invention may be modified so that the vertical adjustment device is in the stand. In such an arrangement a single vertical adjustment device can be used for a number of different microscope attachments.

The mounting block 11 is joined to a supporting bridge 7 which is attached to a tube 8 of the microscope. Pivotally mounted within the block 11 is a shaft 12 carrying a locking member or cross bar 13 adjacent one end thereof. The other end of shaft 12 is threaded at 14 and is received in a threaded bore 15 in the mounting block. An operating lever 16 extends radially from the shaft 12 outwardly of the mounting block.

Figure 3:
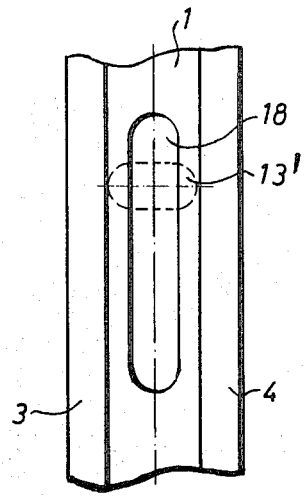
FIG. 3 is an elevational view of a portion of the supporting surfaces of the stand of FIGS. 1 and 2.

As may be seen in FIG. 3 and stand 1 is provided with a vertically extending slot 18 positioned between the supporting surfaces 3 and 4. The length of the slot 18 is considerably longer than the length of the locking member 13 so as to permit the locking member to be inserted readily into the slot and also to provide for a coarse vertical positioning of the instrument upon the stand. The slot 18 is formed in a wall of the stand having a rear or inner surface 19. This portion of the stand is indicated at 20.

In order to mount the instrument upon the stand the operating lever 16 is moved to the unlocked position so that the locking member 13 is parallel to the slot 18. The mounting block surfaces 5 and 6 are then positioned against the supporting surfaces 3 and 4 of the stand and the locking member 13 inserted through the slot 18. When the operating lever 16 is rotated, the locking member 13 rotates in a corresponding manner. The operating lever 16 is then pivoted through an angle of about 90° and the cross bar is similarly pivoted to the position 13' as shown in FIG. 3. Since the locking member 13 is positioned behind the surface 19, rotation of the operating lever will cause the locking member to become positioned behind this surface.

Simultaneously with this rotary movement of shaft 12, the shaft will move axially because of its threaded connection in the mounting block. This axial movement will draw the locking member 13 tightly against surface 19 with the result that the supporting surfaces 3, 4 and 5, 6 are tightly urged against each other. When this has been accomplished, the microscope is now in its locked position and is aligned for use.

In order to remove the microscope tube 8 from the stand 1, the operating lever 16 is rotated in the opposite direction through an angle of about 90° so that the locking member 13 is similarly rotated 90° and can be withdrawn through the slot 18. At the same time that the locking member 13 is being rotated to a position parallel with the slot 18 the locking member is also being moved axially away from the surface 19 so as to unlock the mounting block 11 from the stand.

The positioning of the mounting block 11 and the microscope tube 8 on the stand by means of the operating lever 16 accomplishes a coarse vertical adjustment of the microscope. Any subsequently required fine adjustment can then be carried out with the vertical adjustment device 9 and 10 provided on the microscope in the usual manner.

In FIGS. 4 and 5 there is illustrated a modification of the present invention wherein the axial movement of the locking member 13 is independent of its rotary movement. While such an arrangement has a wide variety of applications it is particularly suitable for use where the microscope tube is relatively heavy. There is a tendency for a heavy tube to tip downwardly when unlocked from the stand since in most cases the user underestimates the weight of the tube and does not immediately catch the tube when it is unlocked from the stand. This tipping of the microscope tube may cause the front lens of the microscope objective to impact the stage or even the specimen slide so that both the slide and the lens may be damaged. This modification may also be employed where the microscope is provided with a particularly valuable objective and it is desired to eliminate as much as possible any liklihood of damage to the objective.

As may be seen in FIG. 5 the operating lever 16 is axially displaceable in a tubular casing 35 which extends tangentially outwardly from an annular housing 36. The inner end of the lever 16 is provided with threads 21 which form, in effect, a rack engageable with a pinion gear 22 fixedly attached to the shaft 12. When an axial force is applied to the operating lever 16 in a direction indicated by the arrow 23 the shaft 12 together with the locking member 13 will be rotated.

The shaft 12 is secured against axial displacement and is supported in a tubular housing 27 provided with external threads 28 which engage internal threads 29 of a member 30 which is fixedly attached to the microscope tube and may be a part of the mounting block. The housing 27 is secured by screws as may be seen in FIG. 4 to a radial wall 37 of the annular housing 36.

When the operating lever 16 is pivoted in a direction indicated by the arrow 31, the housing 27 will rotate within the memeber 30 and thus will move axially with respect thereto. This axial movement will be transmitted by shaft 12 to the locking member 13 so that this locking member is released from the surface 19.

The advantages of the modification of FIGS. 4 and 5 will be readily apparent in describing the procedure followed in removing a microscope which has been locked in position on the stand. To unlock or detach the microscope from the stand, the operating lever 16 must first be pivoted in a direction of the arrow 31. This pivoting movement is transmitted through the housing 36 and tubular member 27 to the shaft 12 which moves axially so that the locking member 13 is moved away from the surface 19. It is necessary to first separate the locking member 13 from the surface 19 since if it were attempted to rotate the locking member 13 by moving operating lever 16 axially, the frictional force between the locking member 13 and the surface 19 would be sufficiently great to prevent such a rotary movement. However, when the locking member 13 is separated from the surface 19 the microscope tube 8 will tip downwardly somewhat to such an extend that an edge of the locking member 13 will abut against surface 19. Even in this position, axially moving operating lever 16 in the direction of the arrow 23 will not produce any rotary movement of locking member 13 because of the friction still existing between the locking member 13 and the surface 19. There is still a firm connection between the microscope tube 8 and the stand 1.

In order to remove the microscope tube 8 from the stand it is necessary that the user lift the tube with one hand so that the microscope is raised from the tipped position. In this position, the locking member 13 is now free and can be rotated by applying an axial force to the operating lever 16. Rotating the locking member 13 through an angle of about 90° will permit the locking lever to be withdrawn through the slot 18. Since the microscope tube is held in one hand during this releasing operation the weight of the microscope is supported so that dropping of the tube is prevented and the front lens of the objective will not contact the stage 2.

As can be seen in FIGS. 1 and 2 the distance between the microscope tube 8 and the stand 1 is somewhat greater than the conventional distance because of the mounting block 11. This block 11 can be provided with a recess 40 in which is mounted an electric light so as to provide a source of illumination downwardly against the stage 2.

Thus it can be seen that the present invention has disclosed an instrument mount for precision instruments, such as microscopes, wherein a locking device is moved both axially and rotatably in order to effect locking or unlocking of the instrument onto a stand. The axial movement of the locking member may be either concurrent with its rotative movement or may be made independently thereof. By providing a separate axial and rotary movement of the locking member a microscope tube which is relatively heavy can be prevented from dropping during the releasing operation since it becomes necessary for the user to hold the microscope tube with one hand in order to actuate the locking member to permit release of the microscope from the stand.

It will be understood that the present invention is susceptible to modification in order to adapt to different usages and conditions.

What is claimed is:

1. In a supporting mount for an instrument stand, a stand having supporting surface means thereon, second supporting surface means on a mounting block of an instrument to be mounted on the stand, said stand and said mounting block supporting surface means being similarly shaped so that they can be superposed on each other, and means for lockingly engaging the stand and mounting block to urge the superposed supporting surface means tightly against each other to maintain an instrument in a locked position in the stand, said locking means comprising a locking member rotatably mounted on the instrument mounting block and engageable with the stand, and means for moving axially said locking member during rotary movement thereof wherein said means for moving axially said locking member is independently operable from the rotary movement thereof.

2. In a supporting mount as claimed in claim 1 wherein said operating lever is also axially movable, and means interconnecting said operating lever and said locking member for moving said locking member axially in response to pivoting of the operating lever and for rotating said locking member in response to axial movement of said operating lever.

3. In a supporting mount as claimed in claim 2 wherein said means comprises a pinion gear secured to said locking member and a rack on said operating lever engaging said gear so that axial movement of said operating lever rotates said locking member.

4. In a supporting mount as claimed in claim 2 and comprising a sleeve threadedly engaged within said mounting block and connected to said operating lever, said locking member being connected to said sleeve for movement therewith so that pivoting of said operating lever rotates said sleeve to bring about an axial movement of the sleeve and locking member.

* * * * *